(12) United States Patent
Diao et al.

(10) Patent No.: US 11,793,705 B2
(45) Date of Patent: Oct. 24, 2023

(54) FALL-RESISTANT METHOD OF INTELLIGENT ROLLATOR, INTELLIGENT ROLLATOR AND CONTROLLER THEREOF

(71) Applicant: ZHEJIANG YIHENGYUE MEDICAL TECHNOLOGY CO., LTD., Taizhou (CN)

(72) Inventors: Jian Diao, Taizhou (CN); Mao Gong, Taizhou (CN)

(73) Assignee: ZHEJIANG YIHENGYUE MEDICAL TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 18/016,160

(22) PCT Filed: Aug. 20, 2021

(86) PCT No.: PCT/CN2021/113781
§ 371 (c)(1),
(2) Date: Jan. 13, 2023

(87) PCT Pub. No.: WO2023/015598
PCT Pub. Date: Feb. 16, 2023

(65) Prior Publication Data
US 2023/0190568 A1   Jun. 22, 2023

(30) Foreign Application Priority Data

Aug. 13, 2021   (CN) .......................... 202110931763.8

(51) Int. Cl.
*A61H 3/04* (2006.01)
*B60T 7/12* (2006.01)
(Continued)

(52) U.S. Cl.
CPC .................. *A61H 3/04* (2013.01); *B60T 7/12* (2013.01); *B60T 8/1701* (2013.01); *B60T 8/171* (2013.01);
(Continued)

(58) Field of Classification Search
CPC ................ A61H 3/04; A61H 2003/043; A61H 2003/046; A61H 2201/018;
(Continued)

(56) References Cited

U.S. PATENT DOCUMENTS

2009/0045021 A1   2/2009 Einbinder
2015/0066328 A1*  3/2015 Nakada ..................... B62B 9/02
                                                    701/93
(Continued)

FOREIGN PATENT DOCUMENTS

AU    2013303992 A1 *  4/2015  ............. B60K 28/16
CA    2652893 A1       8/2010
(Continued)

*Primary Examiner* — Atul Trivedi
(74) *Attorney, Agent, or Firm* — MUNCY, GEISSLER, OLDS & LOWE, P.C.

(57) ABSTRACT

Disclosed is a fall-resistant control method for an intelligent rollator, an intelligent rollator and a controller. The intelligent rollator has a vehicle body, front wheels and/or rear wheels configured at the bottom of the vehicle body and driven by a motor. The fall-resistant control method includes: recording the current position of the motor as the initial position when the moving speed of the intelligent rollator exceeds a first threshold and the acceleration of the intelligent rollator exceeds a second threshold; determining a first braking torque according to the position change of the motor relative to the initial position, wherein the greater the position change, the greater the first braking torque; determining a second braking torque according to the moving speed and/or acceleration of the intelligent rollator, wherein the greater the moving speed and/or the acceleration, the (Continued)

greater the second braking torque; determining the fall-resistant braking torque according to the first braking torque and the second braking torque.

5 Claims, 3 Drawing Sheets

(51) Int. Cl.
   *B60T 8/17*  (2006.01)
   *B60T 8/171* (2006.01)
(52) U.S. Cl.
   CPC .. *A61H 2003/043* (2013.01); *A61H 2003/046* (2013.01); *A61H 2201/018* (2013.01); *A61H 2201/1207* (2013.01); *A61H 2201/5007* (2013.01); *A61H 2201/5046* (2013.01); *A61H 2201/5064* (2013.01); *A61H 2201/5084* (2013.01)
(58) Field of Classification Search
   CPC .... A61H 2201/1207; A61H 2201/5007; A61H 2201/5046; A61H 2201/5064; A61H 2201/5084; B60T 7/12; B60T 8/1701; B60T 8/171
   USPC .......................................................... 701/70
   See application file for complete search history.

(56) References Cited

U.S. PATENT DOCUMENTS

| | | | | |
|---|---|---|---|---|
| 2019/0070060 A1* | 3/2019 | Choi | ............... | G05D 17/02 |
| 2019/0125610 A1* | 5/2019 | Murakami | ............. | A61H 3/008 |
| 2019/0125615 A1* | 5/2019 | Murakami | ............. | A61H 1/024 |
| 2019/0209413 A1* | 7/2019 | Lee | ............... | A61H 1/0266 |
| 2019/0240103 A1* | 8/2019 | Hepler | ............... | A61H 3/00 |
| 2020/0085666 A1* | 3/2020 | Seo | ............... | A61H 1/0262 |
| 2020/0188215 A1* | 6/2020 | Park | ............... | G06F 17/16 |
| 2020/0237586 A1* | 7/2020 | Choi | ............... | A61G 5/1016 |
| 2023/0190568 A1* | 6/2023 | Diao | ............... | B60T 7/12 |
| | | | | 701/70 |

FOREIGN PATENT DOCUMENTS

| | | | | |
|---|---|---|---|---|
| CA | 2605609 C | | 11/2010 | |
| CN | 101815492 A | | 8/2010 | |
| CN | 102247262 A | | 11/2011 | |
| CN | 106672140 A | * | 5/2017 | |
| CN | 108236562 A | | 7/2018 | |
| CN | 109199802 A | | 1/2019 | |
| CN | 208851941 U | | 5/2019 | |
| CN | 110353954 A | | 10/2019 | |
| CN | 110680682 A | * | 1/2020 | .......... A61H 1/0277 |
| CN | 111075858 A | | 4/2020 | |
| CN | 11904804 A | | 11/2020 | |
| CN | 113712788 A | * | 11/2021 | ............... A61H 3/04 |
| DE | 102011084236 A1 | * | 4/2013 | ............... A61H 3/04 |
| DK | 178556 B1 | | 6/2016 | |
| EP | 3000456 A1 | * | 3/2016 | ............... A61H 3/04 |
| EP | 3443945 A1 | * | 2/2019 | ............... A61H 3/04 |
| FR | 2756189 A1 | | 5/1998 | |
| IN | 2010KN00893 A | | 8/2010 | |
| JP | 2015112329 A | | 6/2015 | |
| JP | 2017035983 A | * | 2/2017 | |
| KR | 20130117367 A | | 10/2013 | |
| WO | 2009026119 A1 | | 2/2009 | |
| WO | WO-2013029578 A1 | * | 3/2013 | ............. A61H 3/008 |
| WO | WO-2015154046 A1 | * | 10/2015 | .......... A61B 5/0002 |
| WO | 2019184084 A1 | | 10/2019 | |
| WO | WO-2021123700 A1 | * | 6/2021 | ............... A61H 3/04 |
| WO | 2021132324 A1 | | 7/2021 | |
| WO | WO-2023272772 A1 | * | 1/2023 | |
| WO | WO-2023007623 A1 | * | 2/2023 | |

\* cited by examiner

FALL-RESISTANT METHOD OF INTELLIGENT ROLLATOR, INTELLIGENT ROLLATOR AND CONTROLLER THEREOF

CROSS-REFERENCE TO RELATED APPLICATIONS

This application claims priority to PCT Application No. PCT/CN2021/113781 filed on Aug. 20, 2021, which claims priority to Chinese Patent Application No. 202110931763.8 filed on Aug. 13, 2021. The entire contents both of which are hereby incorporated by reference.

FIELD OF TECHNOLOGY

This disclosure relates generally to intelligent walking aids, in particular to a fall-resistant control method and device thereof for an intelligent rollator, an intelligent rollator and a controller.

BACKGROUND

With the development of the times and the progress of technology, there are numerous assistive walkers with 4 legs for senior people or people with weak legs, permitting more efficient ambulation over distance.

Currently there are three main types of assistive walkers with 4 legs on the market, including:

1. Footed walker: One end of each of the four legs is similar to that of a cane.

This kind of walkers has better slip resistance, but requires a user to lift or move the walker from side to side in order to walk forward, which is inconvenient to use and not suitable for people with weak hand strength.

2. Wheel-footed walker: one end of each of the two front legs is configured with a normal wheel while one end of each of the two rear legs is similar to that of a cane.

Compared with the footed walker, this kind of walkers has increased mobility with less effort, but it does not provide slip resistance which may result in a great potential safety hazard.

3. Wheeled walker (i.e. rollators) or rollator: the front legs are configured with universal wheels, and the rear legs are configured with ordinary wheels.

Wheeled walkers are more flexible in the control of the walking direction and are equipped with hand brakes, which have certain slip resistance. However, hand brakes require strong hands of the user and are not suitable for people with weak hand strength.

Therefore, there is still a need in the art for improved rollators with adjustable slip resistance and good safety to better help senior people or people with poor physical strength.

SUMMARY

Therefore an object of the present application is to provide slip-resistant and fall-resistant control methods and devices for intelligent rollators, rollators and controllers thereof, which provide reverse force during the movement of intelligent rollators, so as to improve the slip resistance and fall resistance of intelligent rollators.

According to a first aspect of embodiments of the present application, there is provided a slip-resistant control method for an intelligent rollator having a vehicle body, front wheels and/or rear wheels configured at the bottom of the vehicle body and driven by a motor. The method includes the following steps:

obtaining the slip-resistant control parameters of the intelligent rollator when the intelligent rollator moves, wherein the slip-resistant control parameters include at least one of the following: the rotation speed of the motor, the rotation acceleration of the motor, the slip-resistant control level of the intelligent rollator;

applying a torque to the motor in a direction opposite to the rotation direction of the motor, wherein the magnitude of the torque is positively related to the magnitude of the slip-resistant control parameters.

When the slip-resistant control parameters include a rotation speed of the motor and/or a rotation acceleration of the motor, the method further includes:

obtaining the slip-resistant level of the intelligent rollator according to the preset gear parameters;

determining the maximum value of the torque according to the slip-resistant level.

The method further includes:

obtaining the pre-set minimum threshold of slip-resistant intervention;

zeroing the torque when the intelligent rollator moves at a speed less than the minimum threshold of slip-resistant intervention.

When the slip-resistant control parameters include the slip-resistant control level of the intelligent rollator, the method further includes:

obtaining the threshold of the level of slip-resistant intervention corresponding to the current slip-resistant control level;

zeroing the torque when the intelligent rollator moves at a speed less than the threshold of the level of slip-resistant intervention.

The method further includes:

obtaining the attitude of the rollator;

reducing the torque when the attitude indicates that the rollator is on an uphill surface;

increasing the torque when the attitude indicates that the rollator is on a downhill surface.

According to a second aspect of embodiments of the present application, there is provided a fall-resistant control method for an intelligent rollator having a vehicle body, front wheels and/or rear wheels configured at the bottom of the vehicle body and driven by a motor. The method includes the following steps:

recording the current position of the motor as the initial position when the moving speed of the intelligent rollator exceeds a first threshold and the acceleration of the intelligent rollator exceeds a second threshold;

determining a first braking torque according to the position change of the motor relative to the initial position, wherein the greater the position change, the greater the first braking torque;

determining a second braking torque according to the moving speed and/or acceleration of the intelligent rollator, wherein the greater the moving speed and/or the acceleration, the greater the second braking torque;

determining the fall-resistant braking torque according to the first braking torque and the second braking torque;

applying the fall-resistant braking torque to the motor in the opposite direction of the movement of the motor.

The method further includes:

determining the fall-resistant braking torque according to the first braking torque, after the position change of the motor reaches the maximum value.

Further, after the position change of the motor reaches the maximum value, the method includes:

stopping to apply the fall-resistant braking torque to the motor, when the position change of the motor is reduced to an amount less than or equal to a first disengagement threshold, and/or when the difference between the fall-resistant braking torque and the maximum fall-resistant braking torque is greater than or equal to a second disengagement threshold.

According to a third aspect of embodiments of the present application, there is provided a slip-resistant control device for an intelligent rollator having a vehicle body, front wheels and/or rear wheels configured at the bottom of the vehicle body and driven by a motor. The device includes:

a slip-resistant control parameter acquisition module, for obtaining the slip-resistant control parameters of the intelligent rollator when the intelligent rollator moves, wherein the slip-resistant control parameters include at least one of the following: the rotation speed of the motor, the rotation acceleration of the motor, the slip-resistant control level of the intelligent rollator;

a torque application module for applying a torque to the motor in a direction opposite to the rotation direction of the motor, wherein the magnitude of the torque is positively related to the magnitude of the slip-resistant control parameters.

According to a forth aspect of embodiments of the present application, there is provided a fall-resistant control device for an intelligent rollator having a vehicle body, front wheels and/or rear wheels configured at the bottom of the vehicle body and driven by a motor. The device includes:

a position record module for recording the current position of the motor as the initial position when the moving speed of the intelligent rollator exceeds a first threshold and the acceleration of the intelligent rollator exceeds a second threshold;

a first braking torque determination module for determining a first braking torque according to the position change of the motor relative to the initial position, wherein the greater the position change, the greater the first braking torque;

a second braking torque determination module for determining a second braking torque according to the moving speed and/or acceleration of the intelligent rollator, wherein the greater the moving speed and/or the acceleration, the greater the second braking torque;

a fall-resistant braking torque determination module for determining the fall-resistant braking torque according to the first braking torque and the second braking torque;

a fall-resistant braking torque application module for applying the fall-resistant braking torque to the motor in the opposite direction of the movement of the motor.

According to a fifth aspect of embodiments of the present application, there is provided an intelligent rollator, which includes:

at least one memory and at least one processor;
one or more programs stored in the memory,
wherein the one or more programs are executed by the at least one processor to implement the steps of a slip-resistant control method and/or a fall-resistant control method for an intelligent rollator according to any one of the above embodiments.

According to a sixth aspect of embodiments of the present application, there is provided a controller, which includes:

at least one memory and at least one processor;
one or more programs stored in the memory,
wherein the one or more programs are executed by the at least one processor to implement the steps of a slip-resistant control method and/or a fall-resistant control method for an intelligent rollator according to any one of the above embodiments.

The slip-resistant and fall-resistant methods and devices for intelligent rollators, rollators and controllers thereof provided by the present fully consider different physical conditions of users and different road conditions when walking to satisfy personalized slip-resistance requirements of various usages. In the intelligent slip-resistant mode, the reverse torque is automatically adjusted according to the moving speed and acceleration of the rollator, making slip-resistance more intelligent; in the constant slip-resistant mode, different reverse torque is provided according to the user's preset slip-resistant level, and combined with the detected attitude, the reverse torque is automatically decrease or increase when going up or down slopes, which is more flexible to satisfy the actual needs of the user. And in above two slip-resistant modes, there is further provided an active fall-resistant function, so that if the user has an accident in the process of use, a reverse braking torque will be applied to the motor, which means the rollator will provide a reverse support force to the user to prevent from falling due to the sudden acceleration and rapid movement of the intelligent rollator, which greatly improves the safety performance of the intelligent rollator and secures the safety of the user.

These and other features, aspects and advantages of the present application will become better understood with reference to the following drawings, description and claims.

BRIEF DESCRIPTION

Designations: 11—Front wheel; 12—Rear wheel; 13—Armrest; 14—Operation terminal; 15—Control terminal; 16—Power supply.

DETAILED DESCRIPTION

In order to make the object, technical scheme and advantages of this application more clear, the embodiments of the present application will be described in further detail below with reference to the accompanying figures.

It will be appreciated that the described embodiments are only a part of the embodiments of the present application, rather than all the embodiments. Based on the embodiments described in the present application, persons of ordinary skill in the art can obtain all other embodiments without creative work, which are all within the protection scope of the embodiments of the present application.

The terminology used herein is for the purpose of describing particular embodiments only and is not intended to be limiting of the application. As used herein, the singular forms "a," "an," and "the" are intended to include the plural forms as well as the singular forms, unless the context clearly indicates otherwise. It will be further appreciated, the term "and/or" includes any and all combinations of one or more of the associated listed items.

Where the following description refers to the figures, like designations denote like members in different figure unless otherwise indicated. The implementations described in the illustrative embodiments below are not intended to represent all implementations consistent with this application. Rather, they are merely examples of apparatus and methods consistent with some aspects of the present application, as recited in the appended claims. In the description of this application, it will be appreciated that the terms "first", "second", "third", etc. are only used to distinguish similar objects, and are not necessarily used to describe a specific order or sequence, nor as indicating or implying relative importance. For those of ordinary skill in the art, the specific meanings of the above terms in this application can be understood according to specific situations.

Also, in the description of the present application, unless otherwise specified, "a plurality" means two or more. "And/or", which describes the relationship between related objects, means that there can be three kinds of relationships, for example, A and/or B, which can mean that A exists alone, A and B exist at the same time, and B exists alone. The character "/" generally indicates that the related objects are an "or" relationship.

An intelligent rollator described in this application embodiment can specifically be a wheeled walker with 4 legs, an electric wheelchair, a shopping stroller, a cart, etc. Specifically, as an example shown in FIG. 1, an intelligent rollator has front and rear wheels, and the rear wheels or front wheels are driven by an electric motor.

Figure 1:
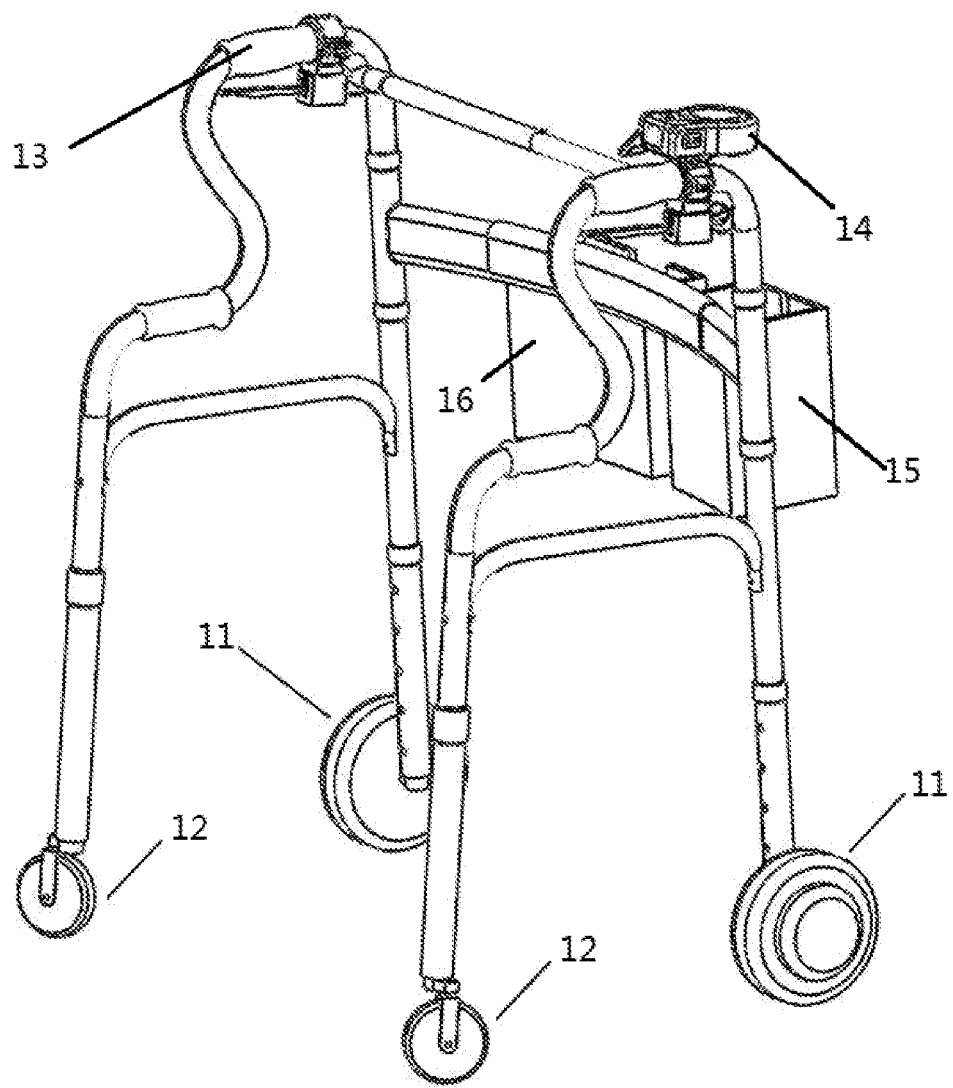
FIG. 1 is a schematic structural view of an intelligent rollator according to some embodiment of the present application.

In FIG. 1, the intelligent rollator includes a vehicle body having front wheels 11 and rear wheels 12 at the bottom of the vehicle body. The front wheels 11 are driven by a motor, and the rear wheels 12 are driven universal wheels. In other embodiments, according to the actual application, the rear wheels may be driven by a motor while front wheels are driven wheels; or both the front and rear wheels can be driven by a motor.

In the embodiment as shown in FIG. 1, the left and right sides of the intelligent rollator are provided with handrails 13 for a user to grasp. One of the handrails is provided with an operation terminal 14. And the vehicle body is provided with a control terminal 15 and a power supply 16.

The operation terminal 14 includes function buttons, a display module and a constant speed detection sensor. The function buttons include at least an on/off button, a slip-resistant mode selection button, and a fall-resistant release button. The display module can be used to display the parameters of the intelligent rollator in operation such as speed, gear position, slip-resistant control level, remaining power, function selected, etc. Further, the display module can be used with the function buttons together by the user to adjust various gears and parameters of the intelligent rollator conveniently. It will be appreciated by those skilled in the art that the display module can be a touch display screen for human-computer interaction, and any one or more function buttons can be replaced by icon buttons in the UI interface of the touch display screen.

The control terminal 15 includes a core controller, a speed measurement module, an attitude detection module, a current detection module, a voltage detection module and a motor drive module, wherein the speed measurement module can obtain the rotation speed of the motor through the position of the motor, and further calculate the moving speed of the intelligent rollator based on the rotation speed, and the attitude detection module can be a three-axis gyroscope for detecting the attitude of the intelligent rollator. In this embodiment of the present application, the motor control of the intelligent rollator is implemented by a core controller, which may be a control chip, such as an FPGA chip, or in other embodiments, the core controller can be other controllers or control chips, or it can also be the control chip set in the operation terminal.

In the traditional solution, the wheels of the intelligent rollator are not configured with motors, and the control of slip resistance is generally realized by manually controlling the handbrakes, which requires high hand strength and fine control. On the one hand, when the speed of the rollator is fast and an emergency stop is required, the user need to grip the handbrakes vigorously; on the other hand, in the normal forward moving, the speed may be sometimes fast and sometimes slow, which requires the user to keep holding the handbrakes all the way and adjust the holding strength to match the speed accordingly. Therefore it is difficult for users with weak hand strength and poor fine control to prevent slipping, which may results in a safety hazard of slipping to fall during use.

Regarding to above-mentioned problem, in embodiments of the present application, based on the use of traditional handbrakes to prevent slipping, the front wheels and/or rear wheels of the rollator are improved to be driven by a motor, and the slip-resistant control is realized via controlling the motor through above-mentioned operation terminal.

Figure 2:
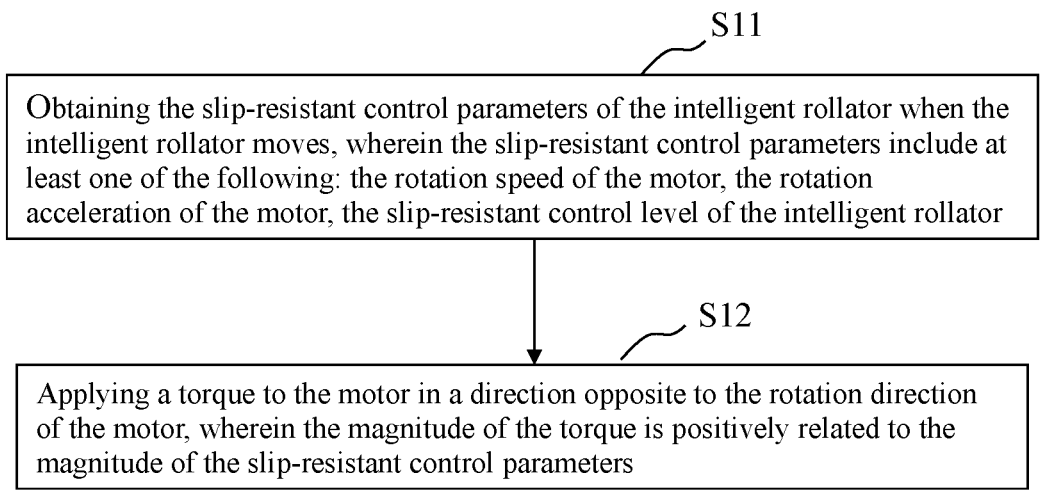
FIG. 2 is s a flow diagram of a slip-resistant control method for an intelligent rollator according to some embodiment of the present application.

In the embodiment as shown in FIG. 2, the slip-resistant control method includes the following steps:

S11: Obtaining the slip-resistant control parameters of the intelligent rollator when the intelligent rollator moves, wherein the slip-resistant control parameters include at least one of the following: the rotation speed of the motor, the rotation acceleration of the motor, the slip-resistant control level of the intelligent rollator;

S12: Applying a torque to the motor in a direction opposite to the rotation direction of the motor, wherein the magnitude of the torque is positively related to the magnitude of the slip-resistant control parameters.

The moving state of the intelligent rollator can be obtained by detecting the rotation speed of the motor by the speed measurement module in the control terminal 15, and the moving state can be forward, backward, or turning.

After the rotation speed of the motor is obtained, the rotation acceleration of the motor can be obtained according to the variation of the rotation speed. The slip-resistant control level may be preset or pre-selected through the operation terminal 14 in FIG. 1.

The above-mentioned positive correlation means that the greater the slip-resistant control parameters, the greater the torque. The magnitude of the reverse torque applied to the motor can be adjusted according to the slip-resistant control parameters, which improves the slip resistance of the intelligent rollator, and makes the use of the rollator safer and more convenient.

In some preferred embodiment, the slip-resistant control described above can be achieved by setting a specific slip-resistant mode, which can be automatically entered or manually selected by triggering the relevant operation of the operating terminal.

In some embodiment, according to different physical conditions of users or different use cases, the slip-resistant modes can include an intelligent slip-resistant mode and a constant slip-resistant mode, which can be freely selected by users. In the intelligent slip-resistant mode, a reverse torque applied to the motor is automatically adjusted according to the moving speed and/or acceleration of the rollator, that is, the rotation speed and/or rotation acceleration of the motor, so as to achieve automatic intelligent slip resistance. In the constant slip-resistant mode, a constant reverse torque matching the slip-resistant level manually selected by the user is applied to the motor.

Preferably, the intelligent slip-resistant mode further allows the user to manually select different slip-resistant gears, each slip-resistant gear corresponding to a different slip-resistant level and each slip-resistant level corresponding to a different torque maximum. In some preferred embodiment, wherein the slip-resistant control parameters include a rotation speed of the motor and/or a rotation acceleration of the motor, the method further includes:

S21: Obtaining the slip-resistant level of the intelligent rollator according to the preset gear parameters;

S22: Determining the maximum value of the torque according to the slip-resistant level.

The preset gears can be preset or pre-selected through the operation terminal 14 in FIG. 1. Each slip-resistant gear corresponds to a different slip-resistant level and thus to a different maximum torque value. After the gear is set, if the value of the reverse torque obtained based on the speed and/or acceleration of the motor rotation is greater than the maximum torque value for that gear, the actual torque applied to the motor will be the maximum torque value for that gear.

In actual use, when the speed of motor rotation is low, the risk of slipping is low, and applying a reverse torque to the motor in this case does not substantially help the user, but instead increases the force required by the user to push the rollator, and brings about a certain waste of resources. Thus, in some preferred embodiment, the method further includes:

S31: Obtaining the pre-set minimum threshold of slip-resistant intervention;

S32: Zeroing the torque when the intelligent rollator moves at a speed less than the minimum threshold of slip-resistant intervention.

The minimum threshold of slip-resistant intervention can be set in the operating system by the manufacturer in combination with past use and experimental data. It can also be set by users through the operation terminal 14 in FIG. 1 according to their own physical conditions or road conditions.

In the constant slip-resistant mode, the slip-resistant control parameters include a preset slip-resistant control level. The higher the level, the greater the reverse torque applied to the motor. Since the reverse torque value corresponding to each level of the constant slip-resistant mode is constant, there may be a situation that when the user pushes the rollator slowly while the reverse torque corresponding to the current level is large, the motor may stop rotating under the action of the reverse torque, and the user cannot move the rollator forward. To solve this problem, in the embodiments of the present application, each slip-resistant control level corresponds to a different level of slip-resistant intervention in the constant slip-resistant mode.

In some preferred embodiment, wherein the slip-resistant control parameters include the slip-resistant control level of the intelligent rollator, the method further includes:

S41: Obtaining the threshold of the level of slip-resistant intervention corresponding to the current slip-resistant control level;

S42: Zeroing the torque when the intelligent rollator moves at a speed less than the threshold of the level of slip-resistant intervention.

Setting the levels of slip-resistant intervention can avoid the case that less powerful users are unable to push the rollator in constant slip-resistant mode.

In addition, the road conditions faced by each user in actual walking may be very complex, wherein both uphill and downhill are common, which will affect the user's walking experience. In order to reduce the difficulty when the user is pushing the rollator uphill, or prevent the slip-resistance reduced when the rollator is accelerated by gravity when the user is pushing the rollator downhill, it is preferable that the posture of the intelligent rollator will be detected in real time and the reverse torque is adjusted accordingly.

In some preferred embodiment, the method further includes:

S51: Obtaining the attitude of the rollator;

S52: Reducing the torque when the attitude indicates that the rollator is on an uphill surface;

S53: Increasing the torque when the attitude indicates that the rollator is on a downhill surface.

In some scenarios where the slope of the uphill is greater, the torque may also be reduced to zero, and a torque in the reverse direction is provided, that is, an upward boost is provided to assist the user to go uphill.

The above slip-resistant control methods can provide appropriate reverse torque according to the user's personal settings and the actual movement of the intelligent rollator, which makes the intelligent rollator more safe and convenient.

Figure 3:
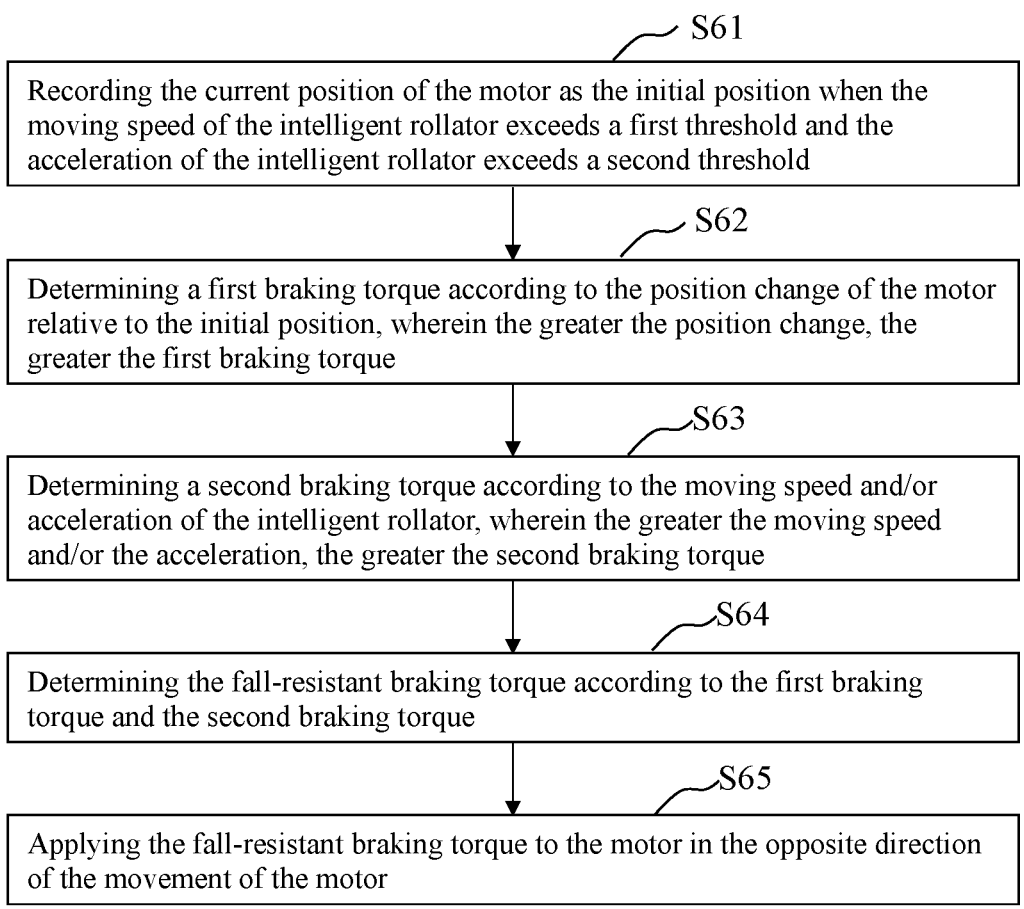
FIG. 3 is s a flow diagram of a fall-resistant control method for an intelligent rollator according to some embodiment of the present application.

However, in some special cases, the intelligent rollator may move too fast or accelerate too fast, while the user may not keep up with the movement of the rollator but still grip the handrails and is pulled by the rollator to lean forward to fall, which is a great hidden danger to the user. Regarding to this problem, as shown in FIG. 3, the present application further provides a fall-resistant control method for an intelligent rollator that in some embodiment, the fall-resistant control method for an intelligent rollator includes:

S61: Recording the current position of the motor as the initial position when the moving speed of the intelligent rollator exceeds a first threshold and the acceleration of the intelligent rollator exceeds a second threshold;

S62: Determining a first braking torque according to the position change of the motor relative to the initial position, wherein the greater the position change, the greater the first braking torque;

S63: Determining a second braking torque according to the moving speed and/or acceleration of the intelligent rollator, wherein the greater the moving speed and/or the acceleration, the greater the second braking torque;

S64: Determining the fall-resistant braking torque according to the first braking torque and the second braking torque;

S65: Applying the fall-resistant braking torque to the motor in the opposite direction of the movement of the motor.

Preferably, when the speed and acceleration of the rollator are increasing and if the acceleration exceeds 1 g and the moving speed exceeds 3.5 km/h, it indicates that the fall alarm value set previously by the system is exceeded at the moment.

The position of the motor at this time is recorded as the initial position, i.e. S0. Meanwhile, the position change and the direction of the rollator are also detected in real time.

When the user leans forward and is about to fall, the rollator moves forward and the motor rotates forward. The control terminal obtains the position of the motor in real time and calculates the difference between the real-time position of the motor and the initial position S0, that is, the position change of the motor, as delS. According to delS, the control terminal calculates the position braking torque of the motor as pwm1.

At the same time, the control terminal calculates the forward moving speed and acceleration of the rollator in real time, and calculates the speed braking torque of the motor accordingly, as pwm2.

Preferably, the sum of pwm1 and pwm2 is the fall-resistant braking torque. Applying the fall-resistant braking torque reversely to the motor can stop the motor from rotating forward.

When the motor stops rotating, the position of the motor is recorded as S1, at which time the difference between S1 and S0 is maximum, and the fall-resistant braking torque at this time is recorded as MaxPwm. Thereafter, the user will slowly stand up straight with the support of the rollator, and meanwhile the rollator will gradually move backward under the action of the reverse torque and the user's grip force. Therefore, after the position change of the motor reaches the maximum value, the fall-resistant braking torque is determined only based on the position braking torque pwm1 of the motor calculated by delS.

After the user gradually stands still, the fall-resistant braking torque applied to the motor can be released through the automatic fall-resistant release algorithm.

As the user is standing up, the force applied to the rollator by the hands gradually decreases, making the rollator start to move backward gradually, and the reverse torque of the motor also starts to decrease, so the difference between the real-time position change and the maximum position change, or the difference between the reverse torque and the maximum fall-resistant braking torque can be used to determine whether the rollator is in a safe state to disengage the fall-resistant mode.

In a preferred embodiment, the difference delS between the current position of the motor and S0 is continuously decreasing and the difference delPwm between the reverse torque and MaxPwm is continuously increasing. When delS is less than the set threshold or delPwm is greater than the set threshold, the application of the fall-resistant braking torque to the motor is stopped, i.e. the fall-resistant mode is automatically disengaged.

In some embodiment, it is also possible for the user to manually choose to exit the fall-resistant mode actively through the control terminal, after the user stands still, to stop applying the fall-resistant braking torque to the motor.

Figure 4:
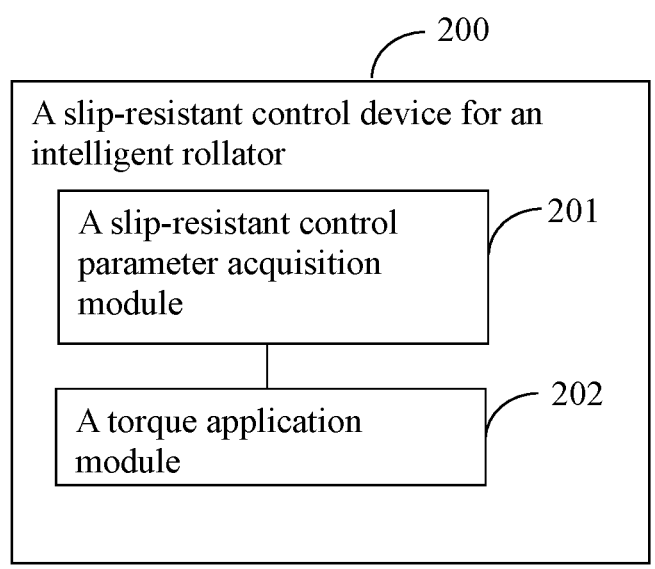
FIG. 4 is a schematic structural view of a slip-resistant control device for an intelligent rollator according to some embodiment of the present application.

In accordance with the above-mentioned slip-resistant control method for an intelligent rollator, some embodiment of the present application further provides a slip-resistant control device 200 for an intelligent rollator as shown in FIG. 4, which includes:
- a slip-resistant control parameter acquisition module 201, for obtaining the slip-resistant control parameters of the intelligent rollator when the intelligent rollator moves, wherein the slip-resistant control parameters include at least one of the following: the rotation speed of the motor, the rotation acceleration of the motor, the slip-resistant control level of the intelligent rollator;
- a torque application module 202 for applying a torque to the motor in a direction opposite to the rotation direction of the motor, wherein the magnitude of the torque is positively related to the magnitude of the slip-resistant control parameters.

Preferably, in some embodiment wherein the slip-resistant control parameters include a rotation speed of the motor and/or a rotation acceleration of the motor, the device further includes:
- a slip-resistant level acquisition module for obtaining the slip-resistant level of the intelligent rollator according to the preset gear parameters;
- a torque maximum determination module for determining the maximum value of the torque according to the slip-resistant level.

Preferably, the device further includes:
- a minimum threshold acquisition module of slip-resistant intervention for obtaining the pre-set minimum threshold of slip-resistant intervention;
- a first torque release module for zeroing the torque when the intelligent rollator moves at a speed less than the minimum threshold of slip-resistant intervention.

Preferably, in some embodiment wherein the slip-resistant control parameters include the slip-resistant control level of the intelligent rollator, the device further includes:
- a level acquisition module of slip-resistant intervention for obtaining the threshold of the level of slip-resistant intervention corresponding to the current slip-resistant control level;
- a second torque release module for zeroing the torque when the intelligent rollator moves at a speed less than the threshold of the level of slip-resistant intervention.

Preferably, the device further includes:
- an attitude acquisition module for obtaining the attitude of the rollator;
- a torque reduction module for reducing the torque when the attitude indicates that the rollator is on an uphill surface;
- a torque increase module for increasing the torque when the attitude indicates that the rollator is on a downhill surface.

In accordance with the above-mentioned fall-resistant control method for an intelligent rollator, some embodiment of the present application further provides a fall-resistant control device for an intelligent rollator including:
- a position record module for recording the current position of the motor as the initial position when the moving speed of the intelligent rollator exceeds a first threshold and the acceleration of the intelligent rollator exceeds a second threshold;
- a first braking torque determination module for determining a first braking torque according to the position change of the motor relative to the initial position, wherein the greater the position change, the greater the first braking torque;
- a second braking torque determination module for determining a second braking torque according to the moving speed and/or acceleration of the intelligent rollator, wherein the greater the moving speed and/or the acceleration, the greater the second braking torque;
- a fall-resistant braking torque determination module for determining the fall-resistant braking torque according to the first braking torque and the second braking torque;
- a fall-resistant braking torque application module for applying the fall-resistant braking torque to the motor in the opposite direction of the movement of the motor.

Preferably, the device further includes:
- a first fall-resistant braking torque determination unit for determining the fall-resistant braking torque based on the first braking torque after the position change of the motor reaches the maximum value.

Preferably, the device further includes:
a fall-resistant braking torque release module for stopping the application of the fall-resistant braking torque to the motor, after the position change of the motor reaches a maximum value, when the position change of the motor is reduced to less than a first release threshold, or, when the difference between the fall-resistant braking torque and the maximum fall-resistant braking torque is greater than a second release threshold.

In accordance with the above-mentioned control methods for an intelligent rollator, some embodiment of the present application further provides an intelligent rollator, which includes:
at least one memory and at least one processor;
one or more programs stored in the memory;
wherein the one or more programs are executed by the at least one processor to implement the steps of a slip-resistant control method and/or a fall-resistant control method for an intelligent rollator according to any one of the above embodiments.

In accordance with the above-mentioned control methods for an intelligent rollator, some embodiment of the present application further provides a controller, which includes:
at least one memory and at least one processor;
one or more programs stored in the memory;
wherein the one or more programs are executed by the at least one processor to implement the steps of a slip-resistant control method and/or a fall-resistant control method for an intelligent rollator according to any one of the above embodiments.

The slip-resistant and fall-resistant methods for intelligent rollators and devices, rollators, controller thereof provided by the present fully consider different physical conditions of users and different road conditions when walking to satisfy personalized slip-resistance requirements of various usages. In the intelligent slip-resistant mode, the reverse torque is automatically adjusted according to the moving speed and acceleration of the rollator, making slip-resistance more intelligent; in the constant slip-resistant mode, different reverse torque is provided according to the user's preset slip-resistant level, and combined with the detected attitude, the reverse torque is automatically decrease or increase when going up or down slopes, which is more flexible to satisfy the actual needs of the user. And in above two slip-resistant modes, there is further provided an active fall-resistant function, so that if the user has an accident in the process of use, a reverse braking torque will be applied to the motor, which means the rollator will provide a reverse support force to the user to prevent from falling due to the sudden acceleration and rapid movement of the intelligent rollator, which greatly improves the safety performance of the intelligent rollator and secures the safety of the user.

The above embodiments are only used to illustrate the implementation of the present application, but not to limit it. While the present application has been described with reference to above embodiments in detail, it will be appreciated by those skilled in the art that various changes may be made and equivalents may be substituted for elements thereof without departing from the scope of the present application.

What is claimed is:

1. A fall-resistant control method for an intelligent rollator having a vehicle body, front wheels and/or rear wheels configured at the bottom of the vehicle body and driven by a motor, comprising the following steps:
recording the current position of the motor as the initial position when the moving speed of the intelligent rollator exceeds a first threshold and the acceleration of the intelligent rollator exceeds a second threshold;
determining a first braking torque according to the position change of the motor relative to the initial position, wherein the greater the position change, the greater the first braking torque;
determining a second braking torque according to the moving speed and/or acceleration of the intelligent rollator, wherein the greater the moving speed and/or the acceleration, the greater the second braking torque;
determining the fall-resistant braking torque according to the first braking torque and the second braking torque;
applying the fall-resistant braking torque to the motor in the opposite direction of the movement of the motor; and
after the position change of the motor reaches the maximum value, stopping to apply the fall-resistant braking torque to the motor, when the position change of the motor is reduced to an amount less than or equal to a first disengagement threshold, and/or when the difference between the fall-resistant braking torque and the maximum fall-resistant braking torque is greater than or equal to a second disengagement threshold.

2. The fall-resistant control method of claim 1, further comprising:
determining the fall-resistant braking torque according to the first braking torque, after the position change of the motor reaches the maximum value.

3. An intelligent rollator, comprising:
at least one memory and at least one processor;
one or more programs stored in the memory,
wherein the one or more programs are executed by the at least one processor to implement the steps of the method according to claim 1.

4. A controller, comprising:
at least one memory and at least one processor;
one or more programs stored in the memory,
wherein the one or more programs are executed by the at least one processor to implement the steps of the method according to claim 1.

5. A fall-resistant control device for an intelligent rollator having a vehicle body, front wheels and/or rear wheels configured at the bottom of the vehicle body and driven by a motor, comprising:
a position record module for recording the current position of the motor as the initial position when the moving speed of the intelligent rollator exceeds a first threshold and the acceleration of the intelligent rollator exceeds a second threshold;
a first braking torque determination module for determining a first braking torque according to the position change of the motor relative to the initial position, wherein the greater the position change, the greater the first braking torque;
a second braking torque determination module for determining a second braking torque according to the moving speed and/or acceleration of the intelligent rollator, wherein the greater the moving speed and/or the acceleration, the greater the second braking torque;
a fall-resistant braking torque determination module for determining the fall-resistant braking torque according to the first braking torque and the second braking torque;
a fall-resistant braking torque application module for applying the fall-resistant braking torque to the motor in the opposite direction of the movement of the motor; and a fall-resistant braking torque release module for stopping the application of the fall-resistant braking torque to the motor, after the position change of the motor reaches a maximum value, the position change of the motor is reduced to less than a first release threshold, or, the difference between the fall-resistant braking torque and the maximum fall-resistant braking torque is greater than a second release threshold.

\* \* \* \* \*